US008962765B2

(12) United States Patent
Pilard et al.

(10) Patent No.: US 8,962,765 B2
(45) Date of Patent: Feb. 24, 2015

(54) METHOD FOR PREPARING TELECHELIC OLIGOMERS FROM TIRE WASTE

(75) Inventors: Jean-Francois Pilard, Pance (FR); Irene Campistron, Le Mans (FR); Faten Sadaka, Le Mans (FR); Albert Laguerre, Le Mans (FR)

(73) Assignees: Centre National de la Recherche Scientifique, Paris (FR); Universite du Maine, Le Mans (FR)

( * ) Notice: Subject to any disclaimer, the term of this patent is extended or adjusted under 35 U.S.C. 154(b) by 242 days.

(21) Appl. No.: 13/578,949

(22) PCT Filed: Feb. 19, 2010

(86) PCT No.: PCT/FR2010/050292
§ 371 (c)(1),
(2), (4) Date: Aug. 14, 2012

(87) PCT Pub. No.: WO2011/101551
PCT Pub. Date: Aug. 25, 2011

(65) Prior Publication Data
US 2012/0323037 A1 Dec. 20, 2012

(51) Int. Cl.
*C08C 19/08* (2006.01)
*C08F 2/38* (2006.01)
*C08J 11/16* (2006.01)
*C08J 11/18* (2006.01)
*C08L 19/00* (2006.01)
*C10G 1/10* (2006.01)
*C10G 50/00* (2006.01)
*C08C 19/04* (2006.01)
*C08C 19/00* (2006.01)

(52) U.S. Cl.
CPC . *C08F 2/38* (2013.01); *C08C 19/04* (2013.01); *C08C 19/08* (2013.01); *C08C 2019/09* (2013.01); *C08J 11/16* (2013.01); *C08J 11/18* (2013.01); *C08J 2300/30* (2013.01); *C08J 2319/00* (2013.01); *C08J 2321/00* (2013.01); *C08L 19/006* (2013.01); *C10G 1/10* (2013.01); *C10G 50/00* (2013.01); *C10G 2300/1003* (2013.01); *Y10S 525/938* (2013.01)
USPC .......... 525/331.9; 525/387; 525/370; 525/938

(58) Field of Classification Search
None
See application file for complete search history.

(56) References Cited

U.S. PATENT DOCUMENTS 3,857,825 A 12/1974 Streck et al.
4,305,850 A 12/1981 Watabe et al.

FOREIGN PATENT DOCUMENTS

DE 146053 1/1981

OTHER PUBLICATIONS

Mauler, Polymer Bulletin 35, 151-156 (1995).*
Saetung, Preparation of Polyurethane Foams from Hydroxytelechelic Oligoisoprenes Obtained by Controlled Degradation of Natural Rubber: Study of T.*
Solanky, Macromolecular Chemistry and Physics, 2005, 206, 1057-1063.*
Gillier-Ritoit, Journal of Applied Polymer Science, vol. 87, issue 1, p. 42-46 (2003).*
International Search Report dated Nov. 22, 2010, in corresponding PCT application.
Sandrine Gillier-Ritoit et al., "Telechelic cis-1,4-Oligoisoprenes through the Selective Oxidolysis of Epoxidized Monomer Units and Polyisoprenic Monomer Units in cis-1,4-Polyisoprenes", Journal of Applied Polymer Science, vol. 87, No. 1, Oct. 31, 2002, pp. 42-46, XP002595172.
Shailendra Singh Solanky et al., "Metathetic Selective Degradation of Polyisoprene: Low-Molecular-Weight Telechelic Oligomer Obtained from Both Synthetic and Natural Rubber", Macromolecular Chemistry and Physics, vol. 206, Issue 10, May 17, 2005, pp. 1057-1063, XP002595174.
Raquel Santos Mauler et al., "Investigation on the styrene-butadiene rubber cleavage with periodic acid under the influence of ultrasonic radiation", Polymer Bulletin, vol. 35, No. 1-2, 1995, pp. 151-156, XP002595177, DOI: 10.1007/BF00312907.
R. S. Mauler et al., "Sonochemical Degradation of 1,4-CIS-Polyisoprene Using Periodic Acid-Solvent and Temperature Effect", European Polymer Journal, Pergamon Press Ltd. Oxford, GB LNKD-DOI:10.1016/S0014-3057(96)00148-6, vol. 33, Issue 3, Mar. 1, 1997, pp. 399-402, XP004116298.
J. C. Marmo et al., "ADMET Depolymerization. Synthesis of Perfectly Difunctional (f=2.0) Telechelic Polybutadiene Oligomers" Macromolecules, vol. 28, No. 8, Apr. 1995, pp. 2602-2606, XP002595173.
Nilubol Kiattanavith et al., "Determination of carbon black filler in natural rubber vulcanizates by olefin metathesis degradation", Polymer Degradation and Stability, Barking, GB LNKD-DOI: 10.1016/0141-3910(93) 90052-K, vol. 41, Issue 1, Jan. 1, 1993, pp. 1-3, XP024144688.
Selena Gutierrez et al., "Degradation of Natural Rubber Via Cross-Metathesis With Functionalized Olefins Using Ruthenium Alkyliden Catalysts", Suplemento De La Revista Latinoamericana De Metalurgia Y Materiales, [Online] vol. S1, No. 4, Jul. 29, 2009, pp. 1463-1467, XP002595176.
J. C. Brosse et al., "Chemical Modifications of Polydiene Elastomers: A Survey and Some Recent Results", Journal of Applied Polymer Science, vol. 78, No. 8, Sep. 14, 2000, pp. 1461-1477, XP002595171.

(Continued)

*Primary Examiner* — Robert C Boyle
(74) *Attorney, Agent, or Firm* — Young & Thompson

(57) ABSTRACT

A method for manufacturing a composition including telechelic oligomers the ends of which carry reactive functions, the method including the contacting of at least one waste material containing rubber, preferable tire waste, with a chemical degradation agent selected from cleavage agents that are specific for double bonds; and a transfer agent in the presence of a catalysts; at a temperature from 15 to 400° C., preferably from 17 to 35° C.; at ambient pressure. The composition of oligomers that can be prepared by the method is also described.

13 Claims, 1 Drawing Sheet

(56) References Cited

OTHER PUBLICATIONS

Daniele Reyx et al., "Controlled degradation in tailor-made macromolecules elaboration. Controlled chain-cleavages of polydienes by oxidation and by metathesis" Die Angewandte Makromolekulare Chemie, vol. 247, Issue 1, Jun. 21, 1996, pp. 197-211, XP002595175.

C. Berrueco et al., "Pyrolysis of waste tyres in an atmospheric static-bed batch reactor: Analysis of the gases obtained", Science Direct, vol. 74, Issues 1-2, Aug. 2005, pp. 245-253.

R. Murillo et al., "The application of thermal processes to valorise waste tyre", Fuel Processing Technology, vol. 87, Issue 2, Jan. 2006, pp. 143-147.

J.P. Busnel, "Data handling in g.p.c. for routine operations", vol. 23, Issue 1, Jan. 1982, p. 137-141.

Saetung, Anuwat, "Preparation of polyurethane foams from Hydroxytelechelic oligoisoprenes obtained by controlled degradation of natural rubber: study of their physico-mechanical, thermal, and acoustic properties", Thesis from Graduate School Prince of Songkla University and Universite du Maine, 2009, pp. 1-219.

* cited by examiner

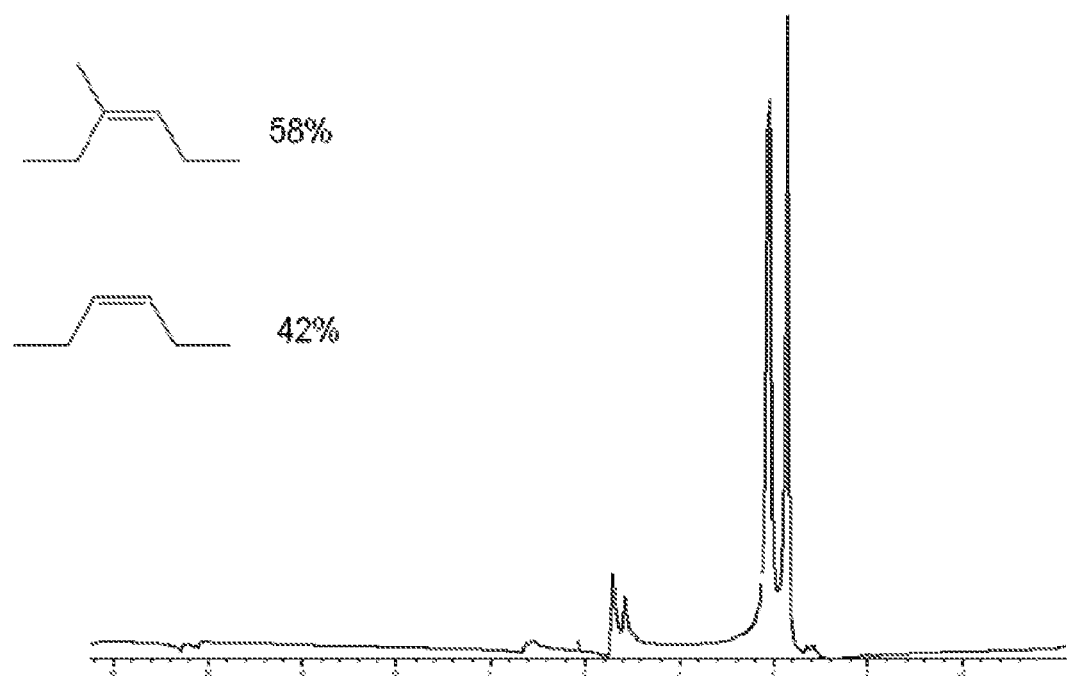

METHOD FOR PREPARING TELECHELIC OLIGOMERS FROM TIRE WASTE

This invention relates to a method for recycling waste containing rubber, in particular tire waste, enabling telechelic oligomers of interest to be obtained, with average molar weights ranging from 500 to 50,000 g/mol by controlled degradation of polydiene chains.

The accumulation of tire waste in the world, which amounts to some hundreds of thousands of tons per year, is a serious environmental problem.

Since the beginning of 1970s, various European Union countries have passed restrictive legislation intended to prohibit the disposal of this waste and to require polluting industries to recycle their waste. Industry is therefore strongly encouraged to reduce its production of waste and/or to reclaim its waste by reuse or recycling, in particular. In France, for example, the law of Jul. 15, 1975, amended by the law of Jul. 13, 1992, lay down legal bases and fundamental principles aiming at greater control of waste. Decree no. 2002-1563 of Dec. 24, 2002 relates more specifically to the removal of tire waste, and imposes constraint on the collection and reprocessing of used tires.

Tire waste are extremely complex materials including, in addition to the polymer material, called "rubber", which represents 43 to 47% by weight of a tire, textile reinforcement materials (5 to 6% by weight), beads, and steel frame (16 to 27% by weight). The rubber part itself is often a mixture of natural and synthetic elastomers (natural rubber, polyisoprene, polybutadiene, butyl rubber, copolymers such as poly (styrene co-butadiene), fillers (in particular carbon black, which may represent about 21% by weight of the tire) and different antioxidants in very small proportions.

The main methods currently known for reclaiming tires are energy reclamation, which uses the calorific power of the tire released by its combustion, and material reclamation, which comprises mechanical reclamation and chemical reclamation; mechanical reclamation uses the whole used tire from which the metal part has been removed, or ground for different applications, in particular in the field of civil engineering; chemical valorization consists of degrading the used tire from which the metal part has been removed, by different techniques such as pyrolysis and thermal, thermomechanical or mechanochemical devulcanization, which consume a large amount of energy and lead to complex and poorly defined hydrocarbon mixtures. These complex non-homogeneous mixtures of organic compounds (C5-C20), with a high proportion of aromatic compounds, may be used as fuels in oil refineries (ref: R. Murillo, E. Aylon, M. V. Navarro, M. S. Callen, A. Aranda, A. M. Mastral, Fuel Process Technol., 87(2), 143-147, 2005. C. Berrueco, E. Esperanza, F. J. Mastral, J. Ceamanos, P. Garcia Bacaicoa, J. Anal. Appl. Pyrolysis, 74(1-2), 245-253, 2005].

The Applicant is interested in the chemical degradation products of tires and other industrial wastes containing at least 10% of natural or synthetic rubber by weight of the total weight of waste, preferably at least 20% to 80%, preferably at least 35% to 70. The Applicant has thus noted that the degradations of the prior art were energy-consuming because they process the waste at a high temperature and high pressure, were relatively expensive due to the price of the reagents used, could be polluting and finally resulted in products of limited industrial interest.

However, the development of new degradation methods encounters numerous technical problems: tire rubbers are, by nature, cross-linked with sulfur or peroxides during the production of the tires. This cross-linking leads to the formation of S—S bonds between the hydrocarbon polymer chains, creating a three-dimensional network causing reinforcement of the rubber (initially viscous), giving it properties of elasticity, resistance to cold and moderate heat and resistance to dissolvents. Any chemical action on the polymer chains requires facilitated access by reagents to their target (the carbon-carbon double bonds and therefore first requires the rupture of the S—S bridges; the reagents usually implemented for polymer degradation were expensive, and difficult to obtain, limiting the industrial interest of the reactions; the catalysts used were often deactivated due to the variety of the components forming the waste.

A real technical problem of recycling tires and other industrial materials containing rubber has thus existed for a long time, because of the heterogeneity of the material composing the waste, and also because of the presence, in large amounts, of carbon black fillers, requiring separation and recovery.

These major problems to be overcome may explain that the chemical recycling currently used are methods that were developed long ago (pyrolysis, devulcanization), that were acceptable, economically speaking, when petroleum-based energy and raw materials were inexpensive. Now, the cost of energy makes these techniques less and less acceptable for concerned industrials and for governments, and there is a real need to find less costly and less polluting alternatives.

The invention proposes a method allowing to produce a homogeneous composition of telechelic oligomers having reactive functions, ketones and aldehydes, at the ends of the oligomer chains, rendering them susceptible of being used as macromonomers capable of being copolymerized with various co-monomers, by controlled degradation of waste containing rubber, at a temperature comprised between 15° and 40° and at ambient pressure. The method according to the invention allows, with respect to the methods of the prior art, to save energy in the reprocessing of the waste, to reduce the pollution resulting from the degradation (no gas release associated with the increase in temperature); no denaturation of the chemical structure of the polymer chains also due to the increase in temperature, and which leads to the formation of aromatic compounds such as benzene and toluene, recognized as being CMR (carcinogenic, mutagenic and reprotoxic) substances; to be more economical and to open up new fields of application for these waste, due to the industrial interest of the oligomers obtained.

Thus, the method of the invention provides a recycling solution weakly energy-consuming, in particular if compared to pyrolysis at 500° C., which is performed in a single step (not including the optional step of separating fillers and volatile organic compounds), non-polluting, implementing inexpensive reagents or reagents that are themselves recyclable, this solution allowing to produce products with a well-defined weight and structure so as to be reused in the synthesis of new materials.

More specifically, the invention relates to a method for producing a composition including telechelic oligomers, said oligomers having, at their ends, reactive functions and having a well-defined structure, as shown by nuclear magnetic resonance analyses and the polymolecularity index, said method comprising:
placing at least one waste product containing rubber, ranging from well-defined products such as production waste to complex tire waste-type formulations, in contact;
with a chemical degradation agent chosen from a cleavage agent that is specific for double bonds; and a transfer agent in the presence of a catalyst;
at a temperature ranging from 15 to 40° C., preferably from 17 to 35° C.,
at ambient pressure.

Advantageously, obtaining oligomers by the method of the invention is effective with good yields ranging from 80 to 100% by weight.

Advantageously, the polymolecularity index of the composition obtained by the method of the invention is about 2, which (1) indicates a statistical cleavage along the chains (2) reflects that all the reagent has been used for carbon-carbon double bond cleavage and (3) proves that there are not side reactions such as, for example, diol and/or epoxide formations without chain cleavage.

The average molar weights by number and the polymolecularity index are determined by SEC (Steric Exclusion Chromatography) at 35° C. using a ThermoFinnigan SEC instrument (equipped with a SpectraSYSTEM AS1000 autosampler, and SpectraSYSTEM UV2000 and SpectraSYSTEM RI150 detectors), with 5-mm MIXED-D gel PL (polymer laboratories) columns calibrated with a series of standard polystyrenes (580-483.103 g.mol-1). THF (1.0 mL/min) is used as eluent. The standardized molecular weights of the polystyrene are corrected by the Benoît B factor as described in Busnel J. P., Polymer, 23, 139, 1982.

According to a preferred embodiment of the invention, the waste is waste that contains a filler, in particular but not exclusively tire waste, and the method preferably includes a subsequent step of separating the solid phase and the liquid phase of the composition, in which the liquid phase, which contains the telechelic oligomers, is recovered. The solid phase, which contains the carbon black, may be reused in a new formulation.

The separation may be performed by any technique known to a person skilled in the art, in particular but not exclusively centrifugation.

In this preferred embodiment of the method of the invention, in which the waste is tire waste, the telechelic oligomers obtained are carbonyltelechelic oligoisoprenes and oligobutadienes.

According to a particular embodiment of the invention, the pneumatic waste used is cut tire, shredded tire, crumb rubber or aggregate, preferably crumb rubber or aggregate, generally obtained by removal of the metal portion of the tire, reducing the temperature and grinding used tires.

According to a first embodiment of the invention, the chemical degradation agent is a cleavage agent that is specific for double bond, very preferably periodic acid.

In this embodiment, advantageously, the reaction time is less than or equal to 48 hours, preferably less than or equal to 24 hours. When periodic acid is the chemical degradation agent, 2 equivalents of periodic acid per double bond to be cleaved are used.

In this first embodiment, advantageously, the oligomers obtained have an average molar weight ranging from 500 to 10,000 g/mol, preferably ranging from 400 to 9000 g/mol, and very preferably ranging from 900 to 7000 g/mol.

According to a second embodiment of the invention, the chemical degradation agent used is a transfer agent, used in presence of a catalyst. The transfer agent is preferably a hydrocarbon molecule having a symmetrically di-substituted carbon-carbon double bond and two acetate, ester, amine, protected alcohol functions . . . . Preferably, the transfer agent is cis-2-butene-1,4-diacetate. According to a preferred embodiment, the catalyst is so-called "Grubbs 2nd generation" catalyst. Hoveyda-Grubbs and Grubbs 3rd generation catalysts may also be used. In this embodiment, preferably, the reaction occurs at room temperature, between 17 and 25° C. Reaction time is from 2 to 5 hours, preferably about 3 hours. Oligomers are obtained with a yield greater than 50% by weight, preferably about 75% by weight. The structure of the oligomers is well defined, as shown by different analyses, preferably including NMR. In this second embodiment, advantageously, the oligomers obtained have an average molar weight ranging from 10,000 to 100,000 g/mol, preferably ranging from 20,000 to 900,000 g/mol, and very preferably ranging from 30,000 to 70,000 g/mol.

According to a preferred embodiment, the method of the invention is implemented directly at the waste production site.

The invention also relates to the telechelic oligomer composition susceptible of being obtained by the method of the invention. Advantageously, said composition is fluid or liquid. According to the invention, the telechelic oligomer composition obtained may then be chemically modified so as to be used in various applications.

According to this invention, the term "waste" means any residue of a transformation production or use process, any substance, material or more generally any good or movable object that is rejected, unwanted, abandoned or that its owner intends to abandon;

the term "waste containing rubber" means any material that is rejected, unwanted, abandoned or that its owner intends to abandon, including synthetic or natural rubber; the term "waste containing rubber" encompasses in particular waste comprising natural rubber, synthetic polyisoprene, polybutadiene, butyl rubber, chloroprene, poly(styrene-butadiene); rubber waste, in the sense of this invention, includes industrial rubber waste and tire waste; "tire waste" includes used tires, tire production waste, retreading waste, and in particular cut tire, shredded tire, aggregate or crumb rubber, the term "cut tire" means a tire that has been cut into pieces with a size greater than 300 mm;

the term "shredded" means tire cut into irregular pieces of 15 to 300 mm;

the term "aggregate" means pieces coming from tires reduced to a particle size ranging from 1 and 15 mm by mechanical, cryogenic or thermal process;

the term "crumb rubber" means a powder formed by particles with a particle size of less than 1 mm, generally obtained by mechanical, cryogenic or thermal reduction;

the term "homogeneous" means having a polymolecularity index ranging from 1 to 3, preferably 1.5 to 2.5, and more preferably about 2. The term homogeneous refers to the chemical structures of oligomers;

the term "about" followed by a numeric value means the numeric value plus or minus 10%;

the terms "carbonyltelechelic" and "telechelic" are used interchangeably in this invention;

the term "controlled degradation" means a degradation reaction allowing to obtain fractions composed of oligomers with homogeneous molar weights and microstructures (functionalities, stereochemistry). The polymolecularity index is a mean used to describe the distribution of molar weights of oligomers obtained after reaction. Nuclear magnetic resonance is used to verify the chemical structure of the composition.

1H spectra and 13C NMR spectra are recorded on a BRUKER 400 Fourier transform spectrometer at 400.13 and 100.62 MHz respectively. The 1H data are reported as follows: chemical shift (multiplicity: s: singulet, t: triplet, q: quadruplet and m: multiplet, integration and assignment of peaks). Chemical shifts are reported in ppm relative to tetramethylsilane (TMS). The $^{13}$C NMR data are reported: chemical shift (assignment of peaks).

The invention will be better understood in view of the following examples, which illustrate the method described above in a non-limiting manner.

EXAMPLE

Tire waste samples are provided by the Delta-Gom company.

Synthesized products are characterized by $^1$H NMR, $^{13}$C NMR, FTIR and steric exclusion chromatography.

As a non-limiting example, if the waste is a tire waste, it contains, once the metal parts have been removed, essentially rubber and carbon black. The number of double bonds to be cleaved is estimated by calculating first the rubber weight:

$$w(\text{rubber}) = w(\text{waste}) - w(\text{carbon black})$$

wherein w is the weight (in the waste, the percentage by weight of carbon black is known, which allows to determine the weight of carbon black);

the number of moles of polyisoprene units or polybutadiene units (therefore the number of double bonds) is calculated according to the general formula:

$$\text{number of double bonds} = w(\text{rubber})/x\% \, M(PI) + y\% \, M(PB)$$

wherein
w(rubber)=rubber weight
M(PI)=molar weight of a polyisoprene unit (68);
M(PB)=molar weight of a polybutadiene unit (54);
x is the percentage of polyisoprene units by weight with respect to the total weight of the rubber,
y is the percentage of polybutadiene units by weight with respect to the total weight of the rubber.

Example 1

In a 30° C. round-bottom flask equipped with a reflux condenser, and a mechanic stirrer, periodic acid in solution in THF (0.47 mol/L) is added dropwise on crumb rubbers (0.5-1.5 mm) or aggregates (1 mm-12 mm) in THF (2 g/50 mL). The reaction is continued for 24 hours at 30° C. The reaction mixture is then centrifuged for 10 minutes at 10,000 rpm so as to recover the carbon black. The organic phase is then filtered on a celite or CaCO$_3$ column, and concentrated with a rotary evaporator. The product obtained is dried under vacuum.

Experimental conditions and yields in oligomers obtained are shown in the table below:

| Examples | Weight of tire waste (g) | Type of tire waste | Weight of periodic acid (g) | T (° C.) | t (h) | Yield (%) |
| --- | --- | --- | --- | --- | --- | --- |
| 1 | 2 | crumb rubber | 0.47 | 30 | 24 | 82 |
| 2 | 2 | crumb rubber | 0.71 | 30 | 24 | 84 |
| 3 | 2 | aggregate | 0.76 | 30 | 24 | 94 |

The $^1$H NMR of the product obtained gives:

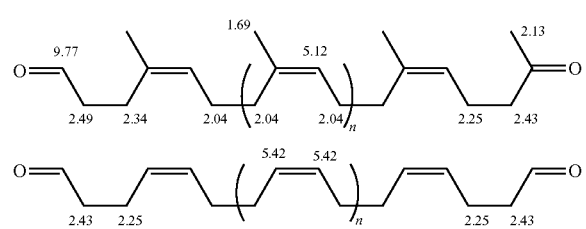

And steric exclusion chromatography indicates an average molar weight ranging from 900 and 7000 g/mol.

Example 2

In a first Schlenk tube, crumb rubbers are introduced in toluene or dichloromethane. In a second Schlenk tube, Grubbs II catalyst and the chain transfer agent (CTA), cis-but-2-ene-1,4-diacetate in the same solvent, are introduced. The contents of the second tube are transferred to the first Schlenk tube using a metallic cannula. The reaction is magnetically stirred for 3 hours. The reaction is quenched by adding ethanol. The reaction mixture is centrifuged for 10 minutes at 10,000 rpm. The solution is filtered on celite or CaCO$_3$. Finally, the solvent is evaporated with a rotary evaporator. The product obtained is dried under vacuum.

Experimental conditions and yields of oligomers obtained are shown in the table below:

| Examples | Mass of tire waste (g) | Solvent | Volume (ml) | Mass of Grubbs II catalyst (g) | Mass of CTA | T (C.°) | t (h) | Yield (%) |
| --- | --- | --- | --- | --- | --- | --- | --- | --- |
| 1 | 0.74 | Dichloromethane | 15 | 0.045 | 0.019 | 17 | 3 | 75 |

The $^1$H NMR of the product obtained gives:

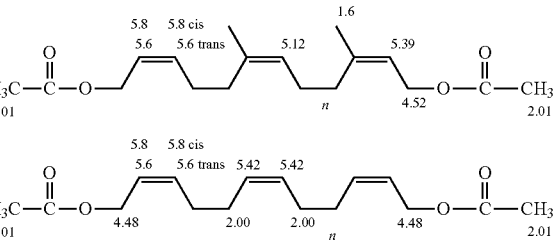

And steric exclusion chromatography indicates an average molar weight ranging from 10,000 and 100,000 g/mol.

The invention claimed is:

1. A method for recycling tire waste, wherein said method comprises:
   placing in contact at least one tire waste containing rubber:
   with a chemical degradation agent selected from the group consisting of (a) cleavage agents that are specific for double bonds comprising periodic acid and (b) a transfer agent with a metathesis catalyst,
   at a temperature ranging from 15 to 40° C., and
   at ambient pressure, leading to a composition comprising a solid phase and a liquid phase, the liquid phase comprising said telechelic oligomers, said composition having a polymolecularity index ranging from 1 to 3; and
   separating the solid phase and liquid phase, wherein the liquid phase comprising said telechelic oligomers is removed.

2. The method according to claim 1, wherein the polymolecularity index of the composition comprising telechelic oligomers is about 2.

3. The method according to claim 1, wherein the tire waste is selected from the group consisting of cut tire, shredded tire, crumb rubber or aggregate, crumb rubber and aggregate.

4. The method according to claim 1, wherein the chemical degradation agent is (a) a cleavage agent that is specific for double bonds comprising periodic acid.

5. The method according to claim 1, wherein the chemical degradation agent is (b) a transfer agent with a metathesis catalyst.

6. The method according to claim 2, wherein the tire waste is selected from the group consisting of cut tire, shredded tire, crumb rubber or aggregate, crumb rubber and aggregate.

7. The method according to claim 2, wherein the chemical degradation agent is (a) a cleavage agent that is specific for double bonds comprising periodic acid.

8. The method according to claim 2, wherein the chemical degradation agent is (b) a transfer agent with a metathesis catalyst.

9. The method according to claim 1, wherein the temperature ranges from 17 to 35° C.

10. The method according to claim 1, wherein the transfer agent is cis-2-butene-1,4-diacetate.

11. The method according to claim 1, wherein the transfer agent is with a metathesis catalyst is selected from the group consisting of a Grubbs $2^{nd}$ generation catalyst, a Grubbs $3^{rd}$ generation catalyst, and a Hoveyda-Grubbs catalyst.

12. The method according to claim 2, wherein the transfer agent is cis-2-butene-1,4-diacetate.

13. The method according to claim 2, wherein the transfer agent is with a metathesis catalyst is selected from the group consisting of a Grubbs $2^{nd}$ generation catalyst, a Grubbs $3^{rd}$ generation catalyst, and a Hoveyda-Grubbs catalyst.

* * * * *